Dec. 18, 1951 L. W. WATERS 2,578,912
APPARATUS FOR REMOVING CANS FROM CARTONS
Filed Feb. 14, 1949 7 Sheets-Sheet 1

INVENTOR.
LAWRENCE W. WATERS
BY
Mellin and Hanscom
ATTORNEYS

INVENTOR.
LAWRENCE W. WATERS
BY
Mellin and Hanscom
ATTORNEYS

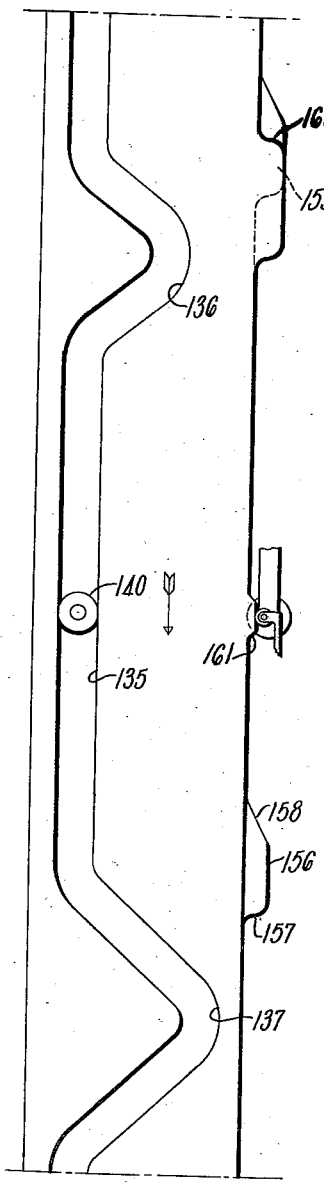
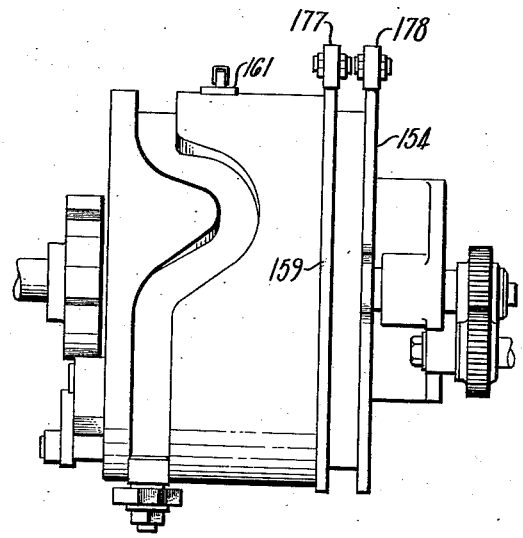
FIG. 5
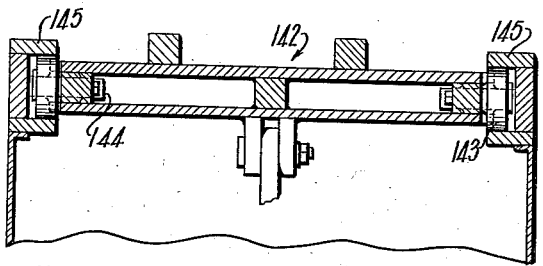
FIG. 7
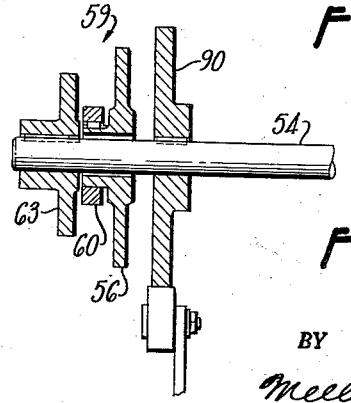
FIG. 6
FIG. 8
INVENTOR.
LAWRENCE W. WATERS
BY
Mellin and Hanscom
ATTORNEYS

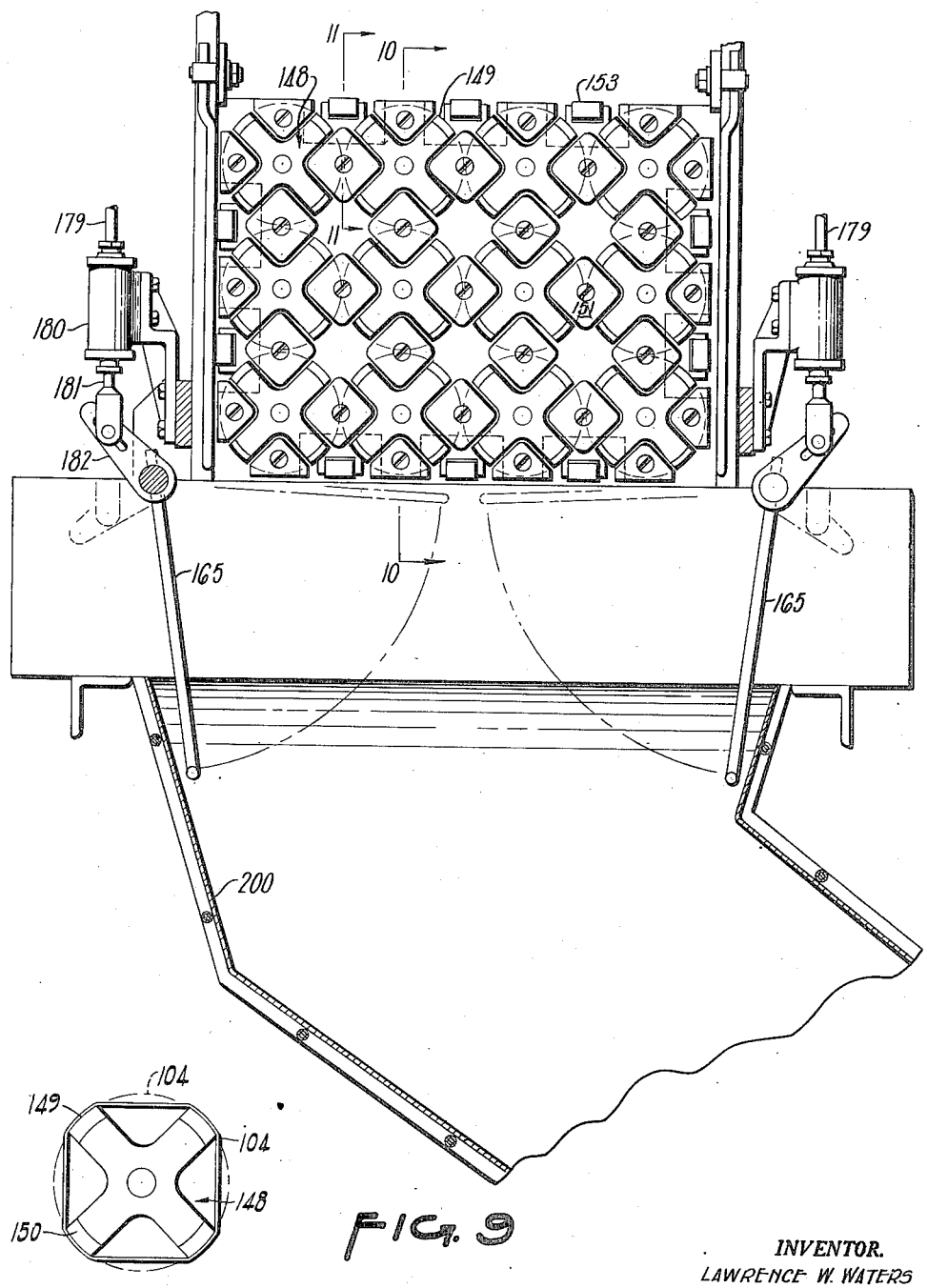

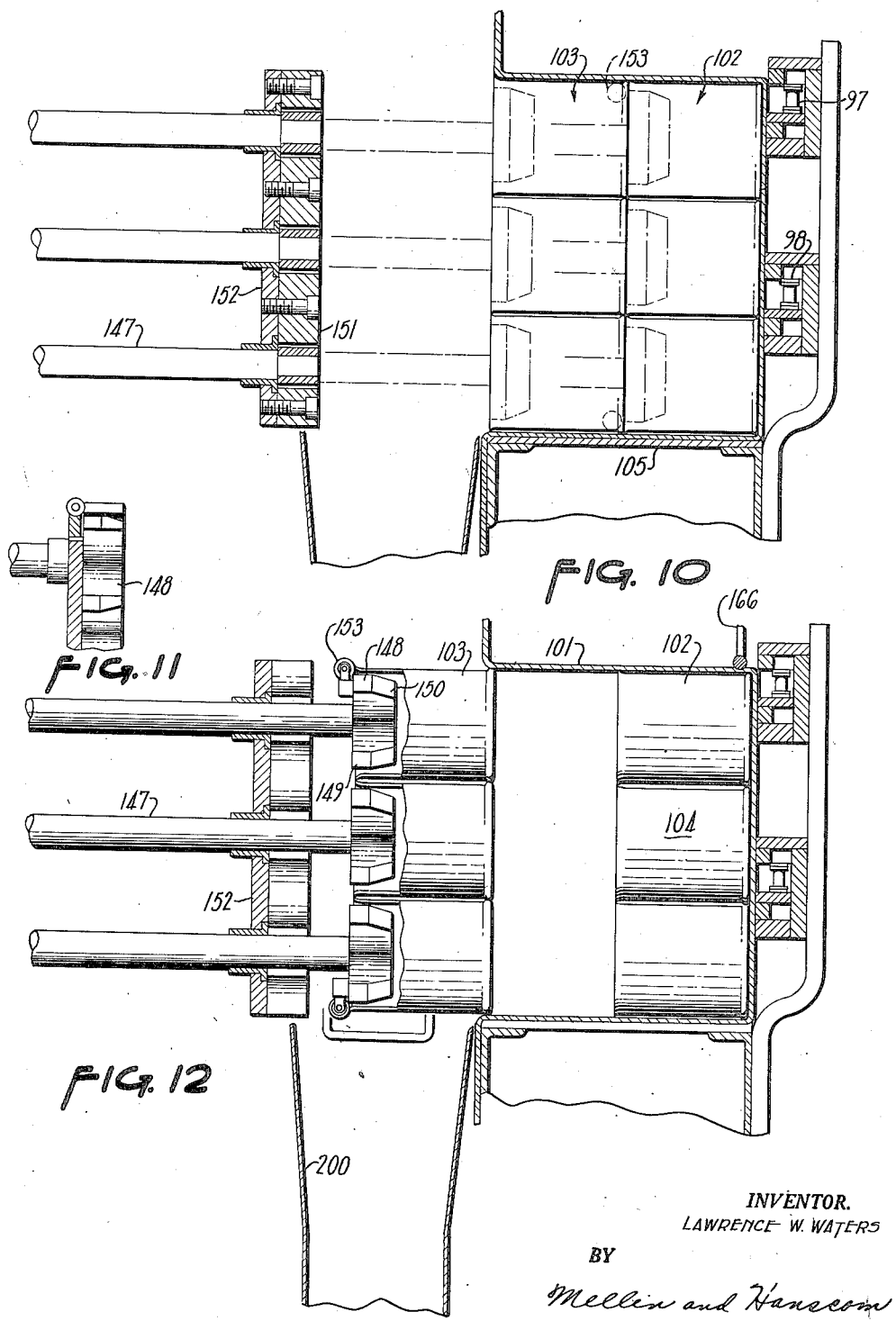

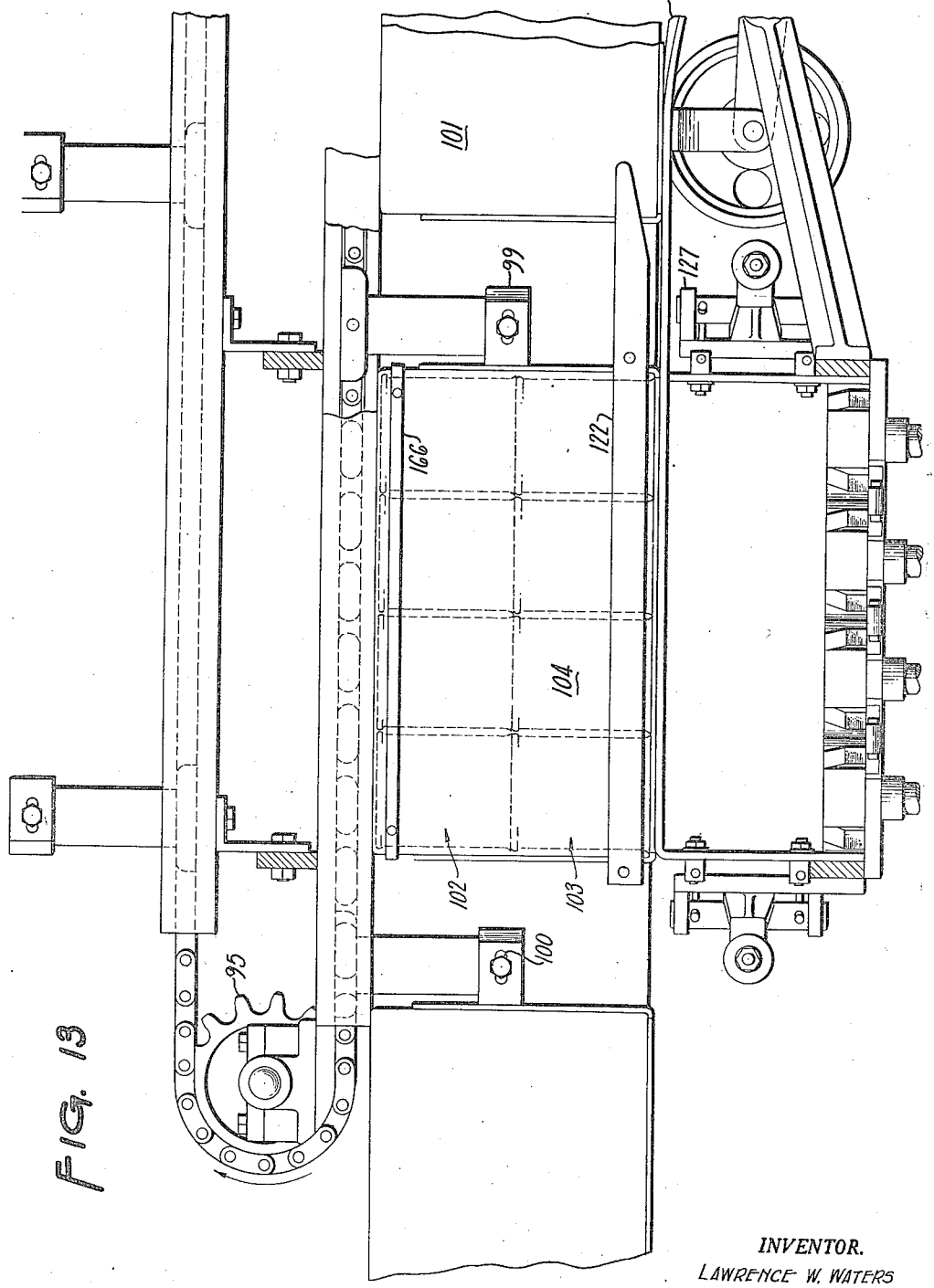

Patented Dec. 18, 1951

2,578,912

UNITED STATES PATENT OFFICE 2,578,912

APPARATUS FOR REMOVING CANS FROM CARTONS

Lawrence W. Waters, Ontario, Calif., assignor to Atlas Imperial Diesel Engine Co., Oakland, Calif., a corporation of Delaware Application February 14, 1949, Serial No. 76,272

14 Claims. (Cl. 214—1.1)

This invention relates to a decasing machine. More particularly, it relates to a machine for automatically removing cans from cartons containing the same.

In canneries, it is common practice to store the empty cans in cartons or cases until needed. Removal of the cans from the cases by hand is time consuming and expensive. In achieving the object of automatic means for removing cans from cases, it is important not only that the decasing operation be carried out rapidly, but that the cans should not be deformed by rough treatment. It is also desirable to provide a machine which is capable of removing both an outer tier of cans and an inner tier of cans from a case, and which does little or no damage to the cases themselves, so that they may be re-used.

It is an object of the present invention to provide a machine for automatically removing cans from cases containing the same.

It is a further object of the invention to provide a decasing machine which is capable of rapidly and accurately removing empty cans from cases thereof without deforming the cans or damaging the cases.

It is a still further object of the invention to provide a decasing machine of the character described which is capable of removing a first or outer tier of cans and a second or inner tier of cans, from cases containing the same.

These and other objects of the invention will be apparent from the ensuing description and the appended claims.

One form which the invention may assume is exemplified in the following description and illustrated by way of example in the accompanying drawings, in which:

Fig. 5 is a section taken along the line 5—5 of Fig. 1, showing the main cam assembly of Fig. 4 in top plan view.

Fig. 6 is a development of the cam of Fig. 5.

Fig. 7 is a section taken along the line 7—7 of Fig. 1, showing the carriage for carrying the plungers employed to extract cans from the cases.

Fig. 8 is a section taken along the line 8—8 of Fig. 3, showing certain details of the main clutch assembly.

Fig. 9 is a section taken along the line 9—9 of Fig. 1, showing the can extractor mechanism in front elevation.

Fig. 10 is a section taken along the line 10—10 of Fig. 9, showing the can extracting plungers in their retracted position, and also showing in broken lines the plungers in their extended positions.

Fig. 11 is a section taken along the line 11—11 of Fig. 9, showing a detail of the plunger construction;

Fig. 12 is a view, similar to that of Fig. 10, showing the plungers extracting a tier of cans from a case.

Fig. 13 is a section taken along the line 13—13 of Fig. 1, showing the conveyor assembly.

Fig. 14 is a more or less diagrammatic view showing, on an exaggerated scale, how the can extracting plungers distort the cans.

Figure 1:
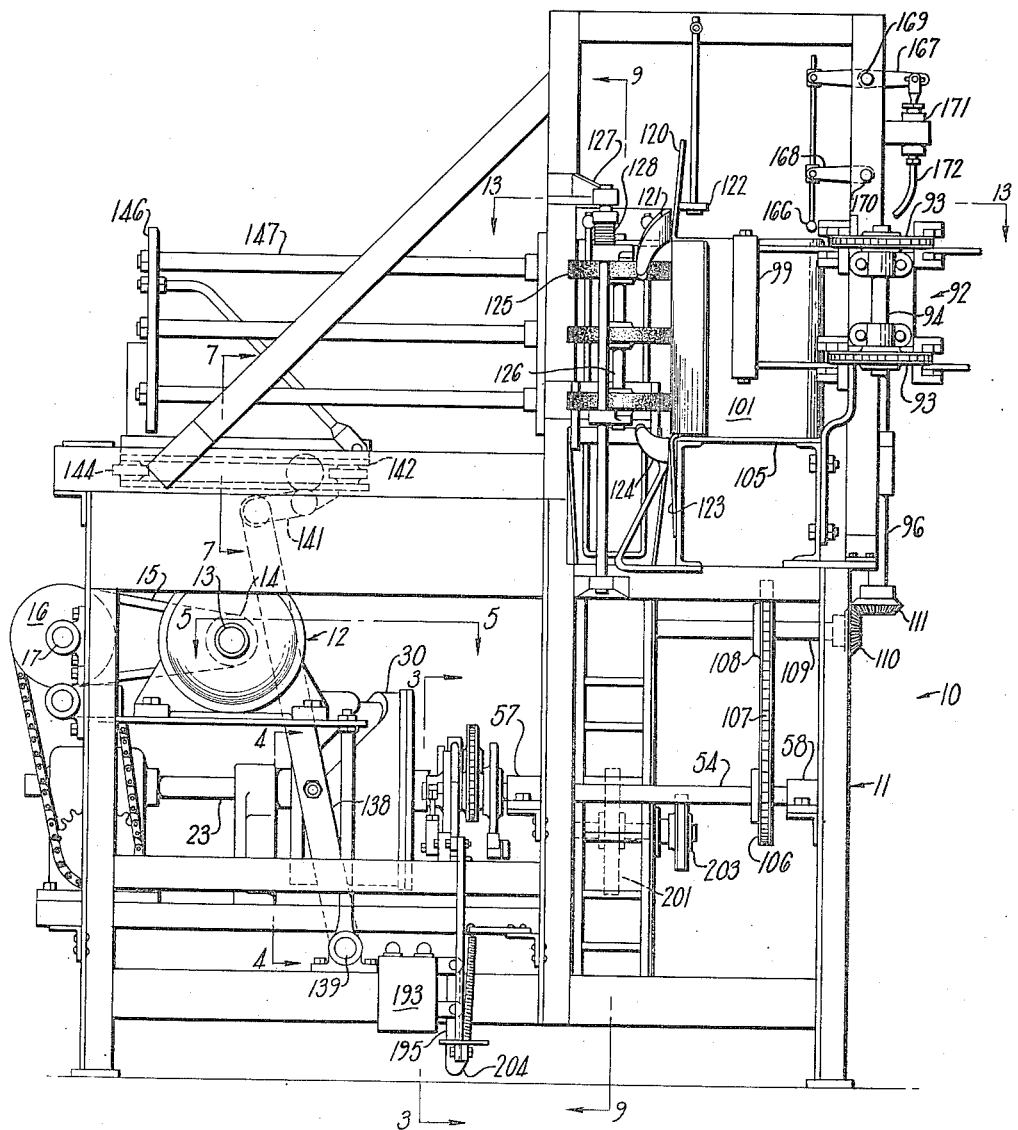
Fig. 1 is a side elevation of the machine.
Figure 2:
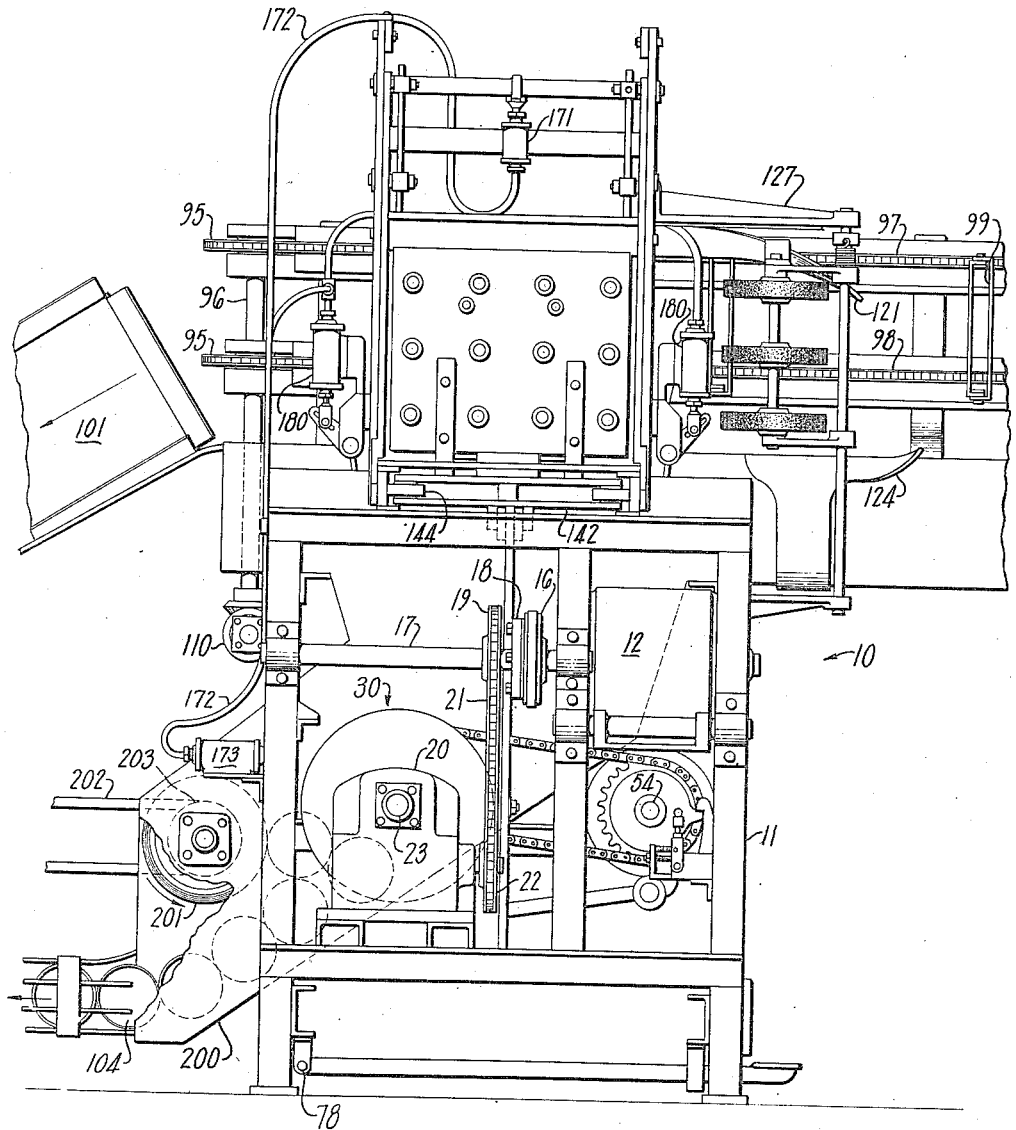
Fig. 2 is a rear end elevation of the same.

Referring to the drawings, and more particularly to Figs. 1 and 2, the machine is generally designated as 10 and the framework as 11. Power is provided by a motor 12 having a shaft 13 to which a pulley 14 is keyed. A V-belt 15 is trained over the pulley 14 and over a pulley 16 which is loose on a shaft 17. A friction clutch is formed by one face of the pulley 16 and by a clutch member 18 which is keyed to the shaft 17. Normally, the clutch members 16 and 18 are engaged, but in the event of jamming of the machine they disengage so as to stop the machine. A sprocket 19 is keyed to the shaft 17 and is connected to a gear reducer 20 through a chain 21 and sprocket 22. A shaft 23 from the gear reducer 20 is journaled at the opposite end of the machine in a bracket 24 (see Fig. 3) and constitutes the main drive shaft of the machine.

Figure 4:
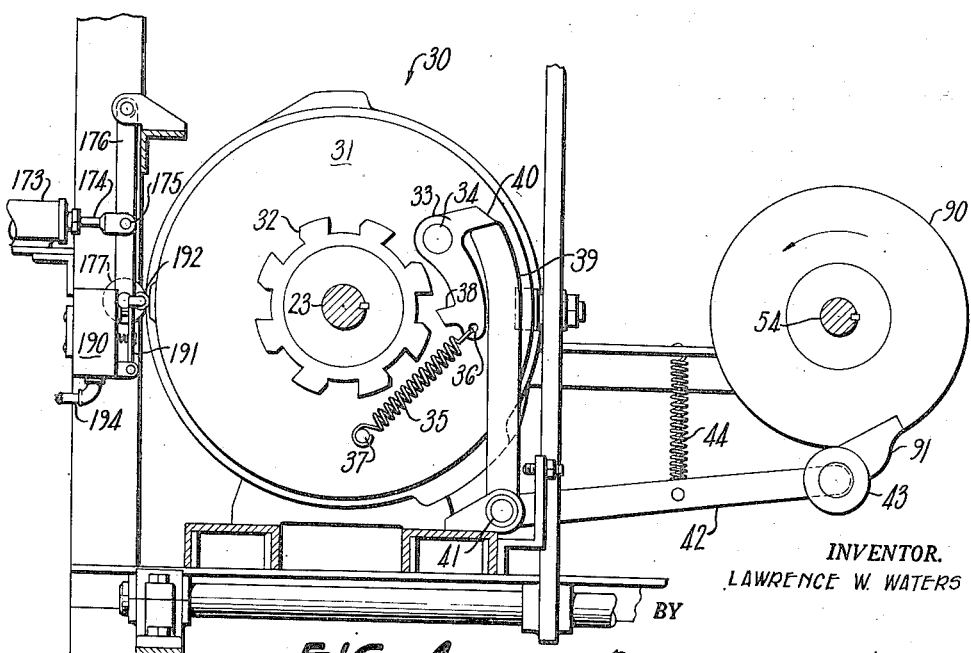
Fig. 4 is a section taken along the line 4—4 of Fig. 1, showing the main cam assembly and means for driving and timing the same.

A main cam assembly 30 is mounted on the drive shaft 23, and it comprises a cam disc 31 which is loose on the shaft 23 and a ratchet wheel 32 keyed to the shaft 23. A pawl 33 is pivotally supported at 34 on the disc 31 and is urged by a spring 35 pinned at 36 to the pawl and at 37 to the disc so as to engage its head 38 with the ratchet wheel, and it is normally pivoted out of engagement with the ratchet wheel by means of a pivotal latch member 39 engaging an arm 40 of the pawl. The latch 39 is secured to a shaft 41 to the other end of which is secured a lever 42 having a roller 43 at its free end. A spring 44 urges the lever 42 upwardly, hence urges latch member 39 counterclockwise as viewed in Fig. 4 and holds the pawl 33 out of engagement with the ratchet wheel 32.

Periodically the lever 42 is rocked to unlatch the pawl 33, in the manner and for the purpose described hereinafter.

Figure 3:
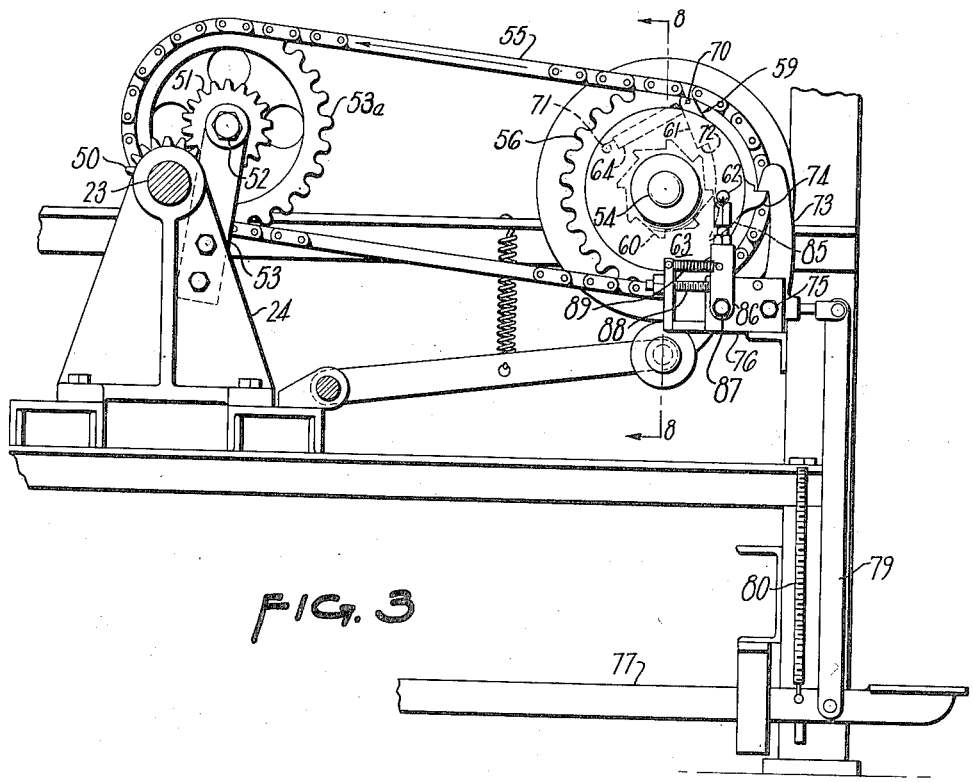
Fig. 3 is a section taken along the line 3—3 of Fig. 1, showing the clutch mechanism.

As stated, the drive shaft 23 is journaled in a bracket 24. Adjacent the bracket 24 is a gear 50 keyed to the shaft 23 and which meshes with a gear 51 which is secured to a shaft 52 journaled in brackets 53. A sprocket 53a on the shaft 52 drives a shaft 54 through a chain 55 and sprocket 56. The shaft 54 is journaled in brackets 57 and 58. The sprocket 56 is loose on the shaft 54, and as shown in Figs. 3 and 8, a single-revolution clutch generally designated as 59, is provided for providing a driving connection between the sprocket 56 and the shaft 54. The clutch 59 comprises a ratchet wheel 60 keyed to the hub of the sprocket 56 and a pawl 61 pivotally supported at 62 on a disc 63 which is keyed to the shaft 54. The pawl 61 is urged by a spring 64 pinned at 70 to the pawl and at 71 to the disc, so as to engage its nose 72 with the ratchet, and it is normally held out of engagement with the ratchet by means of a pivotal latch member 73 engaging an arm 74 of the pawl and pivotally supported at 75 on a bracket 76. The latch 73 is operated by a clutch lever 77 pivotally supported at 78 on the frame (see Fig. 2) and a link 79. A spring 80 urges the clutch lever 77 upwardly, hence keeps the latch 73 in position to hold the pawl 61 out of engagement with the ratchet wheel 60.

The clutch 59 is also provided with a stop member 85 in the form of a cap screw threaded into a bracket 86 which is pivotally supported at 87 and is urged to the left against a stop screw 88 by means of a coil spring 89. Also keyed to the shaft 54 is a cam 90 having a rise 91. The cam 90 engages the roller 43 on the end of the lever 42.

In operation, and as thus far described, the apparatus functions as follows: With the motor 12 operating, the drive shaft 23 will constantly rotate, and with it the sprocket 56. Cams 31 and 90 will be stationary, with the rise 91 in the position shown in Fig. 4. When the clutch lever 77 is depressed the clutch 59 is engaged in the manner described hereinabove, thus causing the cam 90 to rotate in the direction indicated by the arrow in Fig. 4. When the cam 90 has rotated almost 360° the rise 91 will contact the roller 43 and rock the lever 42 to engage pawl 33 with ratchet wheel 32, thus causing rotation of the cam disc 31 to commence. When the shaft 54 has completed one revolution, the clutch 59 will disengage in the manner described hereinabove, thus stopping rotation of the shaft 54. In the meantime, the cam 31 will rotate through 360°, when the pawl 33 will engage the latch 39 and will be pivoted and held out of engagement with the ratchet wheel 32, thus causing further movement of the cam 31 to cease.

A conveyor system generally designated as 92 comprises sprockets 93 on a shaft 94 and sprockets 95 at the opposite end of the machine on a shaft 96. Upper and lower conveyor chains 97 and 98 and pusher members 99 carried by the chains and adjustable longitudinally of the machine by means of bolt and slot connections 100 are also provided. Cases 101 containing an inner tier 102 and an outer tier 103 of cans 104 are supported by a conveyor table 105 and are pushed forwardly by the pusher members 99. The shaft 96 is rotated and the pusher members 99 are advanced, by rotation of the shaft 54 through the medium of a sprocket 106, a chain 107, a sprocket 108 on a shaft 109, and bevel gears 110 and 111.

Top flaps 120 of the case are guided by guide members 121 and 122 and bottom flaps 123 are guided by guide members 124 so as to keep the top and bottom flaps, respectively, out of the way of other parts of the machine. For the purpose of pushing the cans inwardly and evening them up before the can-extracting mechanism is actuated, there is provided a plurality of rubber rollers 125 which are carried by a shaft 126 rotatably supported by brackets 127 and biased toward the cases by a spring 128.

Reverting to the main cam 31, this cam is formed with a peripheral groove 135 (see Figs. 5 and 6) having two rises 136 and 137. An actuator lever 138 pivotally supported by the frame at 139 has a roller 140 which rides in the cam groove 135, and the lever is connected through a link 141 to a carriage 142. The carriage 142 is provided with vertical rollers 143 and horizontal rollers 144, which ride in tracks 145 (see Fig. 7). A bracket 146 supported by the carrier carries rods 147. The opposite end of each rod 147 is provided with a plunger 148 having crossed arms 149 which are tapered at their outer ends at 150. The diameter of the plungers 148 at their outer tapered ends is less than the inside can diameter and rearwardly or inwardly of the tapered ends the diameter of the plunger is somewhat greater than the can diameter.

In retracted position, the plungers 148 are flush with stripper members 151 which are bolted to a plate 152. The outermost plungers 148 are provided with rollers 153 for a purpose described hereinafter.

The main cam 31 is also provided with a cam track 154 having risers 155 and 156, each of which rises steeply at 157 and falls off gradually at 158; with a cam track 159 having a single rise 160; and with a cam rise 161.

The main cam groove 135 actuates the plungers 148 while the cam track 154 actuates can supporting arms 165 (see Fig. 9) and the cam track 159 actuates a hold-down bar 166 (see Fig. 1). The hold-down bar 166 is rocked by arms 167 and 168, which are pivotally supported on the framework at 169 and 170 and are operatively connected with the cam track 159 by means of an hydraulic cylinder 171, a line 172, another hydraulic cylinder 173, a piston rod 174 connected at 175 to a lever 176 and a roller 177 which rides on the cam track 159.

The can supporting arms 165 are actuated by the cam track 154 through the medium of a roller 178, a lever, piston rod and hydraulic cylinder (not shown) similar to the lever 176, rod 174 and cylinder 173; lines 179, hydraulic cylinders 180, piston rods 181 and levers 182, as illustrated.

The cam rise 161 actuates a switch 190 by contacting a spring biased arm 191 and roller 192. The switch 190 forms part of the circuit of a solenoid 193 through a cable 194 (see Figs. 1 and 4). The solenoid 193 operates a latch member 195 in the manner and for the purpose explained hereinafter.

In operation, the machine functions as follows: The operation of the main drive shaft 23, of the main clutch mechanism and of the main cam 31 have been described hereinabove, and it will be apparent that a complete cycle of operation, so far as these elements are concerned, are a single revolution of the shaft 54, followed by a single revolution of the main cam 31. During the rotation of the shaft 54 the conveyor mechanism 92 is caused to advance a case of cans forwardly, or to the left as viewed in Fig. 2, to position the same in precise alignment with the decasing mechanism. By the time the case has reached this position, further rotation of the drive shaft 54 ceases and, accordingly, the case remains stationary for the decasing and stripping operations described hereinafter. At this time the main cam 31 commences its rotation and, through the medium of the actuator lever 138, causes the carriage 142, rods 147 and plungers 148 to make a short forward stroke corresponding to the smaller rise 136 of the cam groove 135, a rearward stroke to the original or rest position, and another and longer forward stroke corresponding to the larger cam rise 137, after which the plungers are withdrawn to their retracted position and the cam 31 ceases rotation, thus bringing to completion one complete cycle of operation.

As best shown in Figs. 10 and 12, on the first or short stroke of the plungers 148, they engage the front tier of cans in a case and, owing to the tapered configuration of the arms 149, the plungers are wedged into the cans sufficiently to draw them out of the case on the return stroke. As the plungers are drawn back to their normal rest position flush with the plate 152, the cans wedged onto the plungers will be stripped therefrom by abutment with the stripper members 151 and will drop downwardly into a chute 200. Similarly, on their second or long forward stroke, the plungers will enter and become wedged into the second or inner tier of cans and will draw them outwardly on the return stroke. The cans will be similarly stripped by means of the stripper members 151 and drop into the chute 200. During the second or long stroke, the rollers 153 carried by the outermost plungers, come into play. These rollers contact and spread the sides of the case and thus facilitate removal of the inner tier of cans.

As shown in Fig. 14, on an exaggerated scale, the cans 104 are distorted by the plungers 148 from their normal circular configuration illustrated in broken lines to a squared configuration illustrated in solid lines. This distortion is very slight, being insufficient to cause any permanent damage to the cans, which spring back to their proper shape after being stripped from the plungers. Nevertheless, this slight distortion serves a very useful purpose, as will now be explained.

The empty cans 104, as is well known, are packed tightly in a case, and their upper, open ends are of a wider outside diameter than the lower, closed ends because the end flanges at the open ends have not been turned. The normal diameter shown for the can illustrated in broken lines is the outside diameter of the end flange, and it will be apparent that the vertical and horizontal diameters of the cans are reduced when they are distorted by the plunger arms 149.

Thus, it will be seen that the arms 149 are at 45° from the vertical and horizontal, thus in effect providing a wedge which "squares" the cans at their open ends and reduces the vertical and horizontal diameters of the cans. It is, of course, these diameters that are in contact in a case. Thus it will be seen that the plungers 148 are not only wedged into the cans, but the cans are squared in a manner to facilitate their extraction.

During the first, short stroke of the plungers, it is desirable to provide support for the inner tier of cans while the outer tier is being withdrawn, so as to prevent any tendency of the inner tier of cans to collapse or become disaligned. Such means is provided in the form of the hold-down bar 166, the operation of which is described hereinabove. The position and timing of this bar are such that it is pressed down upon the upper surface of the case and near its rear edge while the outer tier of cans is being withdrawn from the case, and the hold-down bar is removed from contact with the case thereafter so as not to interfere with removal of the inner tier of cans on the long stroke of the plungers.

An additional operating advantage is provided by means of the can supporting arms 165, the operation of which is described hereinabove. The upward movement of these arms to the position shown in broken lines in Fig. 9, is timed to occur twice during each cycle of operation. The first such movement is when the first or outer tier of cans is withdrawn so as to provide a support for the cans when they are stripped from the plungers. As noted hereinabove, each of the cam rises 155 is provided with a rapid rise 157 resulting in rapid upward movement of the arms 165 so as to bring them quickly into can supporting position when the cans are stripped from the plungers. As also noted, each of the cam rises 155 is provided with a decline 158 resulting in slow, gradual downward movement of the arms 165 so as to release the stripped cans gradually and to allow them to fall slowly and in an orderly fashion into the exit chute, thus preventing jamming of the machine and damage to the cans.

A still further operating advantage is provided in the form of a rubber roller 201 which is rotated by any suitable means, such as a belt 202 and pulley 203 in a counter-clockwise direction as viewed in Fig. 2, thus preventing jamming and damage to the cans.

An additional operating advantage and safety factor are provided by the solenoid 193 and latch 195. As stated hereinabove, the cam 31 is provided with a rise 161 which actuates a switch 190 to energize the solenoid. The solenoid, as stated, operates a latch member. When de-energized the solenoid causes the latch member to be positioned with its nose 204 underneath the clutch lever 78 so as to prevent inadvertent movement of the clutch lever and engagement of the main clutch 59. The rise 161 on the main cam 31 is so positioned that it is in contact with the roller 192, and thus closes the switch 190 when the machine has come to rest at the end of an operating cycle.

It is thus apparent that the solenoid 193 will be energized when the machine has completed a full cycle and is in readiness for commencing a new cycle. Being energized, it will hold the latch member 195 out of engagement with the clutch lever 78 so that, when an operator steps on the clutch lever the clutch 59 will be engaged and a cycle of operation will commence. Almost instantly, however, the roller 192 rides off of the rise 161, thus opening the switch 190, de-energizing the solenoid 193 and causing the latch member 195 to pivot its nose underneath the clutch lever 78 in a position to prevent inadvertent depression of the lever until a complete cycle of operation has been completed. By this means it is ensured that, once the clutch 59 has been purposely engaged to start a cycle of operation, it will automatically become disengaged at the end of one revolution of the shaft 54. Meanwhile the main cam 31 continues through its cycle of operations and the clutch 59 cannot be inadvertently engaged during the period of operation of the main cam 31.

It is thus apparent that a decasing machine has been provided which is operable to automatically remove empty cans from a case thereof and that the machine embodies numerous advantageous features. Thus it is operable to extract an outer tier of cans and an inner tier of cans, and to strip each extracted tier of cans and deliver the same in an orderly manner to an exit chute. It is further apparent that the machine embodies numerous advantageous features such as the one-cycle operation including two sub-cycles, one for operating the conveyor system to convey a case of cans into operative position and cause the same to remain in properly aligned position for subsequent decasing and stripping operations, and another sub-cycle causing the decasing operations to occur after a case of cans has been properly aligned therewith.

While I have illustrated and described my invention in detail, it is to be understood that various changes may be made therein by those skilled in the art without departing from the spirit of the invention as defined in the appended claims.

Having thus described my invention, what I claim and desire to secure by Letters Patent is:

1. A decasing machine comprising a plurality of plungers supported for reciprocation and adapted on the forward stroke to enter and frictionally engage cans arranged in a tier in a case and on the return stroke to withdraw said cans from said case, rollers supported by the outer plungers and so disposed as to engage and spread the sides of a case as the plungers enter the same, and stripper means associated with said plungers to engage and strip cans from said plungers on said return stroke.

2. In a decasing machine comprising a plurality of plungers supported for reciprocation and adapted on the forward stroke to enter and frictionally engage cans arranged in a tier in a case and on the return stroke to withdraw the cans from the case, means for stripping cans from said plungers, and means for imparting to said plungers a short stroke to withdraw an outer tier of cans, and a long stroke to withdraw an inner tier of cans, the improvement which comprises a plurality of rollers supported by the outermost plungers and adapted to engage and spread the sides of a case on the long stroke.

3. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers being of a formation and diametrical dimension to enable it to be projected into interior gripping engagement with the annular wall of a can, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped.

4. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped.

5. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, cam means operatively connected to said plungers for operating the said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped.

6. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, cam means operatively connected to said plungers for operating the said plungers through a can gripping cycle comprising a first shorter stroke to engage the plungers with the cans of the most closely adjacent tier and remove them from the case and a second longer stroke to engage the plungers with the cans of the remaining tier and remove them from the case, said cam means comprising a single cam having a cycle of operation of a single complete rotation and capable upon such single rotation of operating said plungers through the said gripping cycle, stripper means engaging the cans to strip them from the plungers at the ends of the plunger strokes when said cans are disposed in the space between the case and the normal position of the plungers whereby the removed cans may descend by gravity when so stripped.

7. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, cam means operatively connected to said plungers for operating the said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped.

8. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers being of a formation and diametrical dimension to enable it to be projected into interior gripping engagement with the annular wall of a can, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped, can supporting means operating in synchronism with the plungers and automatically moving to a position supporting the removed cans when they have been removed from the case by the plungers and during the stripping operation against descent but moving to a non-obstructing position permitting the cans to descend immediately the stripping is completed.

9. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped, can supporting means operating in synchronism with the plungers and automatically moving to a position supporting the removed cans when they have been removed from the case by the plungers and during the stripping operation against descent but moving to a non-obstructing position permitting the cans to descend immediately the stripping is completed.

10. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, cam means operatively connected to said plungers for operating the said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped, can supporting means operating in synchronism with the plungers and automatically moving to a position supporting the removed cans when they have been removed from the case by the plungers and during the stripping operation against descent but moving to a non-obstructing position permitting the cans to descend immediately the stripping is completed.

11. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers being of a formation and diametrical dimension to enable it to be projected into interior gripping engagement with the annular wall of a can, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped, case spreading means carried by certain of the plungers adapted to engage and spread the sides of the case during the second long stroke of the plungers for removing the second tier of cans from the case.

12. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped, case spreading means carried by certain of the plungers adapted to engage and spread the sides of the case during the second long stroke of the plungers for removing the second tier of cans from the case.

13. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plunger being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers being of a formation and diametrical dimension to enable it to be projected into interior gripping engagement with the annular wall of a can, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped, can supporting means operating in synchronism with the plungers and automatically moving to a position supporting the removed cans when they have been removed from the case by the plungers and during the stripping operation against descent but moving to a non-obstructing position permitting the cans to descend immediately the stripping is completed, case spreading means carried by certain of the plungers adapted to engage and spread the sides of the case during the second long stroke of the plungers for removing the second tier of cans from the case.

14. A can decasing machine comprising a plurality of can gripping plungers reciprocable in a fixed horizontal path, the plungers being relatively fixed and aligned in a vertical plane perpendicular to their path of travel, the number of plungers agreeing with the number of cans in a tier in a case, the axes of the plungers being relatively spaced to correspond and substantially register with the axes of the cans in a tier in a case, means for supporting an open case of cans on one of its sides with the open top thereof disposed in parallelism to the vertical plane in which the plungers are aligned with two tiers of cans therein vertically arranged in parallelism to the vertical plane in which the plungers are aligned with the longitudinal axes of the cans disposed substantially co-extensive relative to the axes of the plungers and their path of travel and with the open ends of the cans facing the plungers with the ends of the cans of the tier most closely adjacent to the plungers being spaced from the plungers when the plungers are in normal position a distance greater than a can length, each of said plungers having circumferentially spaced and diametrically opposed radially extending portions of radial dimensions greater than the radius of the can body to interiorly engage the wall of the can body and slightly distort it for a portion of its length from its open end in a manner decreasing its diametrical dimension on lines parallel to the sides and ends of the case, means for operating said plungers through a can gripping cycle comprising a first shorter stroke to engage the plungers with the cans of the most closely adjacent tier and remove them from the case and a second longer stroke to engage the plungers with the cans of the remaining tier and remove them from the case, stripper means engaging the cans to strip them from the plungers at the ends of the plunger strokes when said cans are disposed in the space between the case and the normal position of the plungers whereby the removed cans may descend by gravity when so stripped, can supporting means operating in synchronism with the plungers and automatically moving to a position supporting the removed cans when they have been removed from the case by the plungers and during the stripping operation against descent but moving to a nonobstructing position permitting the cans to descend immediately the stripping is completed, case spreading means carried by certain of the plungers adapted to engage and spread the sides of the case during the second long stroke of the plungers for removing the second tier of cans from the case.

LAWRENCE W. WATERS.

REFERENCES CITED

The following references are of record in the file of this patent:

UNITED STATES PATENTS

| Number | Name | Date |
|---|---|---|
| 1,319,028 | Grinnell | Oct. 14, 1919 |
| 1,887,163 | Rauberstrauch | Nov. 8, 1932 |
| 1,904,720 | Douglass | Apr. 18, 1933 |
| 2,059,546 | Brandenburg | Nov. 3, 1936 |
| 2,253,283 | Minaker | Aug. 19, 1941 |
| 2,353,736 | Le Frank | July 18, 1944 |
| 2,390,298 | Glassner | Dec. 4, 1945 |
| 2,420,343 | Albertoli | May 13, 1947 |
| 2,466,693 | Fischer | Apr. 12, 1949 |

FOREIGN PATENTS

| Number | Country | Date |
|---|---|---|
| 28,387 of 1903 | Great Britain | Sept. 22, 1904 |